(12) United States Patent
Lentner et al.

(10) Patent No.: US 6,907,782 B2
(45) Date of Patent: Jun. 21, 2005

(54) MICROMECHANICAL INERTIAL SENSOR

(75) Inventors: Konrad Lentner, Mintraching (DE); Stefan Sassen, Munich (DE); Josef Schalk, Altheim (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/433,335

(22) PCT Filed: Nov. 30, 2001

(86) PCT No.: PCT/EP01/14021
§ 371 (c)(1),
(2), (4) Date: May 30, 2003

(87) PCT Pub. No.: WO02/44652
PCT Pub. Date: Jun. 6, 2002

(65) Prior Publication Data
US 2004/0045354 A1 Mar. 11, 2004

(30) Foreign Application Priority Data
Dec. 2, 2000 (DE) .......................... 100 60 091

(51) Int. Cl.[7] ................................................ G01P 9/04
(52) U.S. Cl. .................................................. 73/504.04
(58) Field of Search ......................... 73/504.04, 504.12, 73/504.02, 510

(56) References Cited

U.S. PATENT DOCUMENTS

| | | | |
|---|---|---|---|
| 4,598,585 A | 7/1986 | Boxenhorn | 73/505 |
| 5,488,862 A | 2/1996 | Neukermans et al. | 73/504.02 |
| 5,623,099 A | 4/1997 | Schuster et al. | 73/514.32 |
| 5,712,426 A | 1/1998 | Sapuppo et al. | 73/504.03 |
| 5,996,409 A | 12/1999 | Funk et al. | 73/504.04 |
| 6,032,531 A | 3/2000 | Roszhart | 73/504.04 |
| 6,725,719 B2 * | 4/2004 | Cardarelli | 73/504.04 |

FOREIGN PATENT DOCUMENTS

| | | |
|---|---|---|
| DE | 3509948 | 9/1985 |
| DE | 4439238 | 5/1996 |
| DE | 19719780 | 11/1998 |
| EP | 0442280 | 8/1991 |
| EP | 0786645 | 7/1997 |
| GB | 2130373 | 5/1984 |
| JP | 2000028365 | 1/2000 |
| JP | 2000097708 | 4/2000 |

* cited by examiner

Primary Examiner—John E. Chapman
(74) Attorney, Agent, or Firm—Davidson, Davidson & Kappel, LLC

(57) ABSTRACT

A micromechanical inertial sensor that includes three component planes, namely a bottom part, a center part and a cover part. The center part is a silicon wafer in which a cardan-type (i.e. gimbal) structure with two oscillating elements is formed. A plate is formed in the silicon wafer which can be pivoted about a rotational axis lying in the wafer plane. Metallized portions or conductive layers form an exciter unit and set the gimbal structure oscillating. The inventive sensor further comprises a device for detecting the displacement of the plate. In addition, a method for manufacturing a micromechanical inertial sensor.

18 Claims, 4 Drawing Sheets

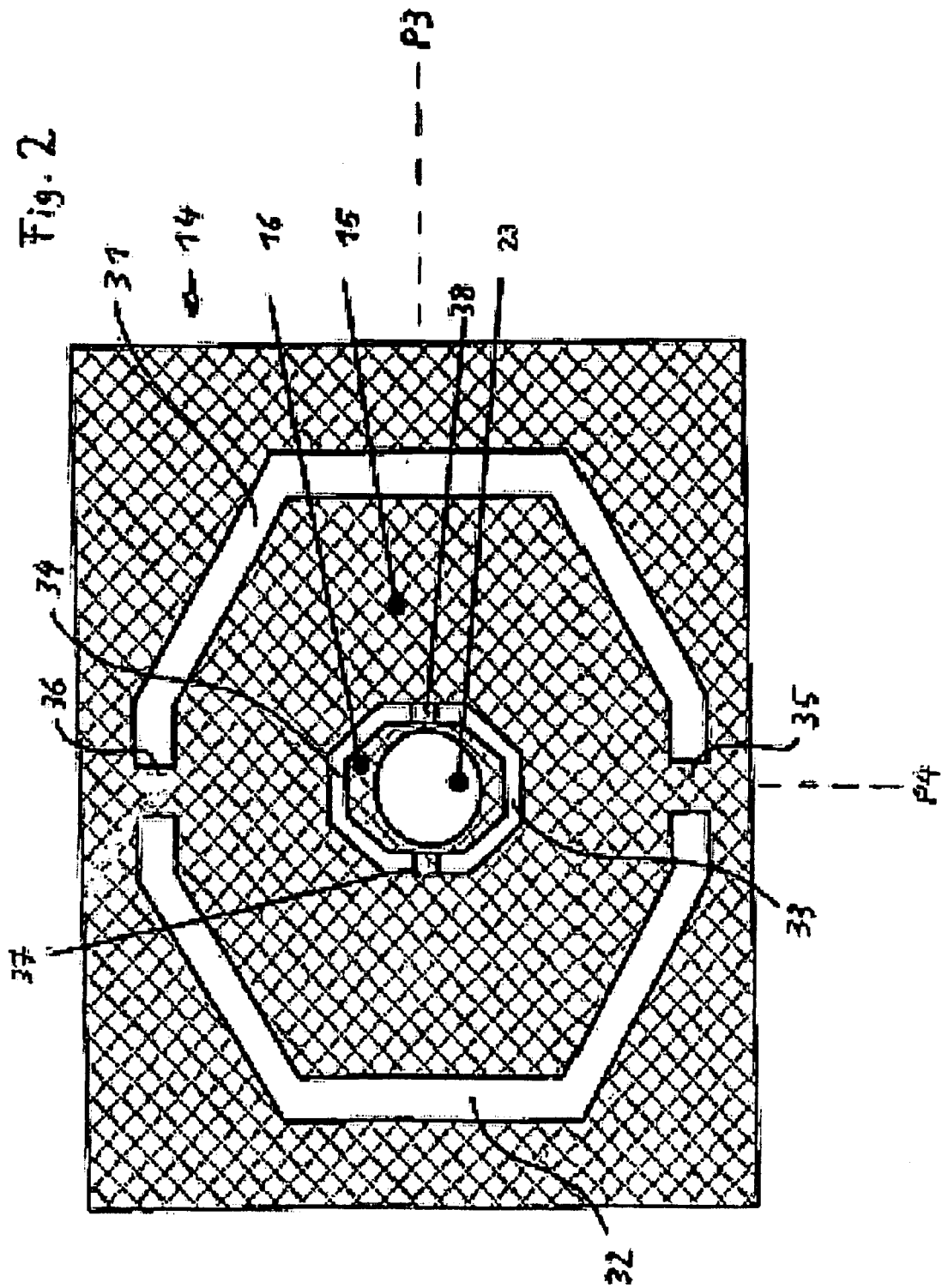

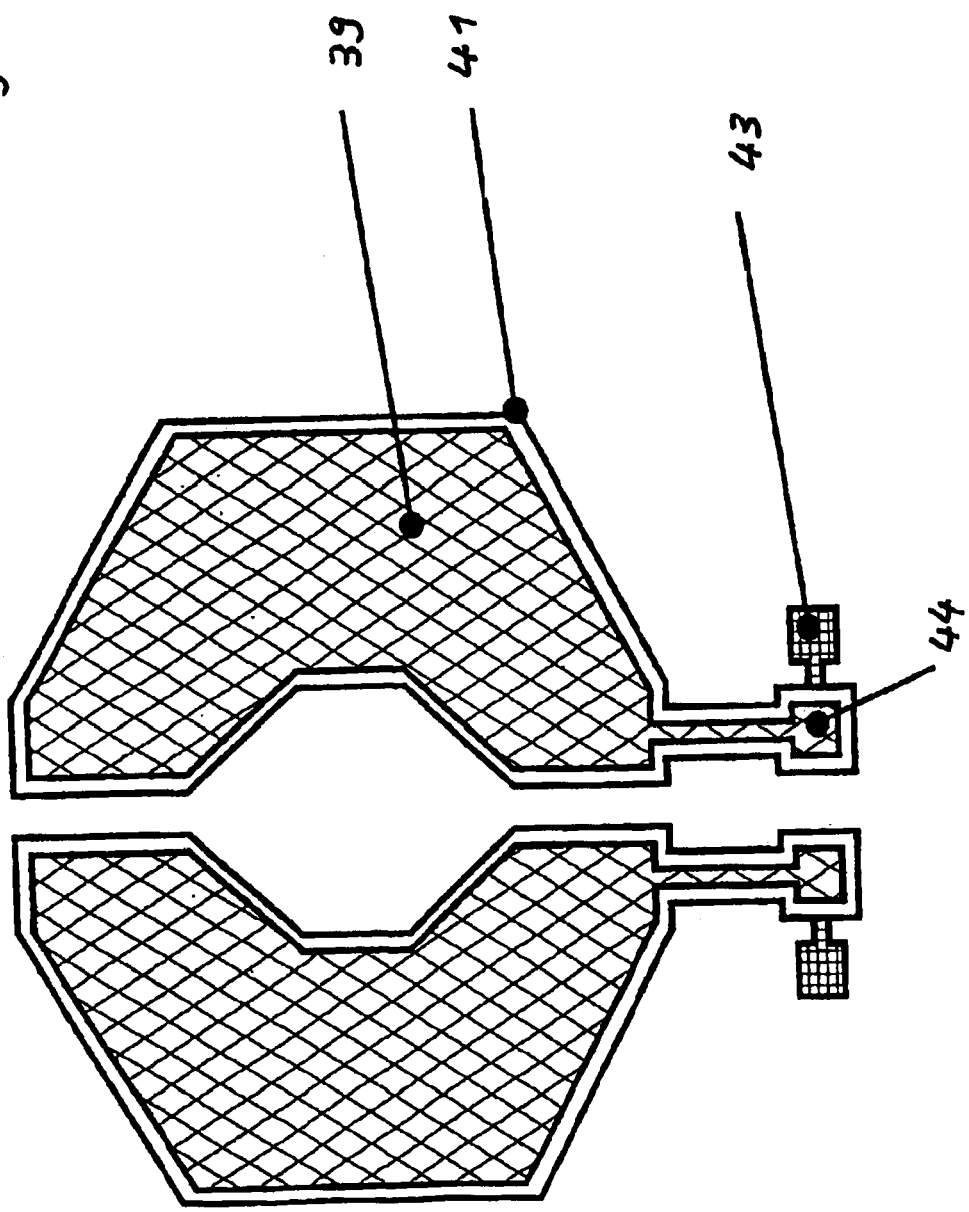

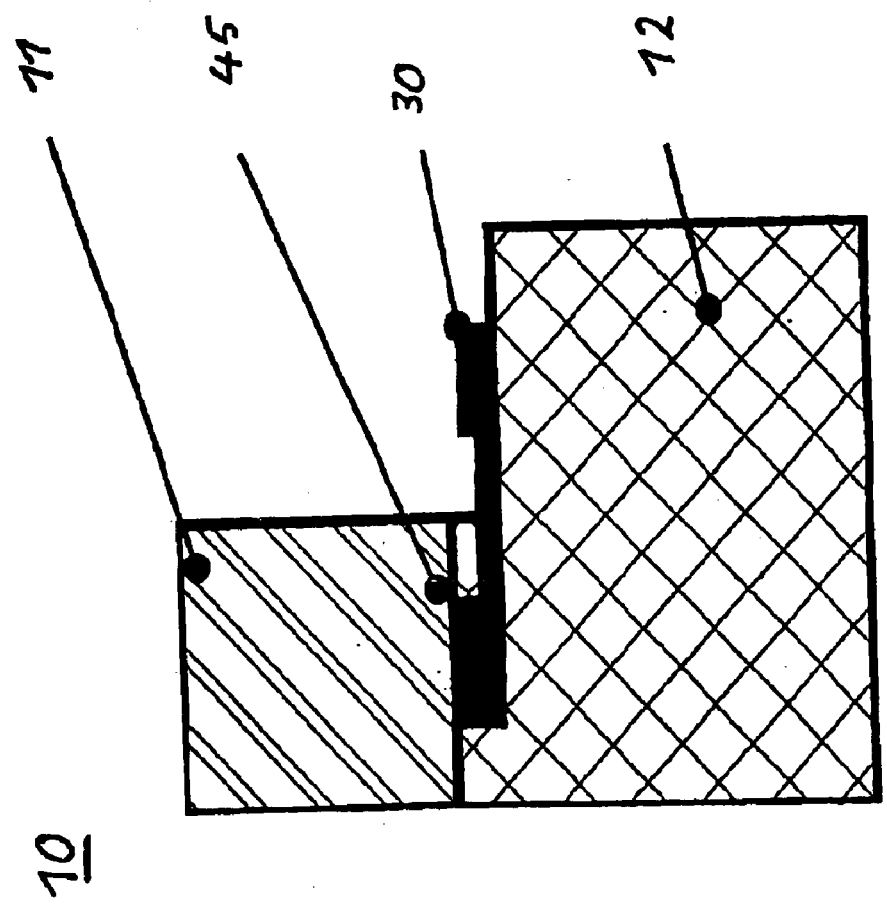

MICROMECHANICAL INERTIAL SENSOR

BACKGROUND

The present invention relates to a micromechanical inertial sensor and to a method for manufacturing a micromechanical inertial sensor.

Micromechanical inertial sensors are used, for example, for measuring accelerations or rates of rotation. The technology of micromechanics allows such acceleration or rate-of-rotation sensors to be produced in a very small space and in a relatively inexpensive manner. In this context, structures are made, for example, from semiconductor components, which allow the measurement of accelerations based on inertial forces or also, for example, the measurement of rates of rotation based on the Coriolis effect.

Sensors of this type can be used in different technical areas, such as in vehicles or in the aviation sector. In motor vehicles, acceleration sensors are used, for example, to trigger air-bag systems. Another field of application is vehicle dymamics control systems, a central part of which is the measurement of the rate of rotation and acceleration in several spatial directions. In navigation applications, accurate measurement of a rate of rotation or acceleration is used to determine the position or path, in particular, as a complement to satellite navigation systems.

In the field of micromechanical inertial sensors, inexpensive solutions are of particular importance in order to allow mass production or use in large numbers. A further important factor is the accuracy of such sensors. Moreover, a small size is of central importance, in particular, for use in mobile systems, such as in land vehicles or aircraft, or also in the space flight applications.

U.S. Pat. No. 4,598,585 discloses a planar inertial sensor having a gimbal structure for measuring rates of rotation based on the Coriolis effect. The gimbal structure is formed in a thin layer of silicon dioxide. A part of the gimbal structure is set into oscillations by a driving element, and a deflection of the other part of the gimbal structure, which occurs during a rotary motion due to action of a Coriolis force, is measured by measuring elements.

An example of a micromechanical acceleration sensor is described in German Patent Application DE 44 39 238 A1. The capacitive acceleration sensor disclosed therein has a planar design and is composed of two semiconductor bodies that are connected to each other in a planar manner. A floating structure is connected to one of the semiconductor bodies and freely movable in a direction perpendicular to the surface of the two semiconductor bodies.

SUMMARY OF THE INVENTION

However, the known micromechanical inertial sensors have the disadvantage that only separate motion data or motion components are measurable. In a conceivable combination of the known sensors into a sensor module, additional error sources would arise during module integration. Moreover, the module integration involves additional costs because the different sensor units have to be combined with each other. In addition, a sensor module of this kind would have a relatively large unit volume.

An object of the present invention is to provide an inertial sensor which allows precise measurement of different types of motion data, but for which, nevertheless, only a small unit size and only little production cost are required. An alternate or additional object of the present invention is to specify a method for manufacturing a micromechanical inertial sensor which results in an inexpensive, small and accurate inertial sensor.

The present invention provides a micromechanical inertial sensor and a method for manufacturing a micromechanical inertial sensor. Further features, aspects and details of the present invention follow from the claims, the description and from the drawings.

The micromechanical inertial sensor according to the present invention has a gimbal structure which is formed, for example, in a wafer and which includes two oscillating elements that are coupled and have axes of oscillation which are aligned substantially perpendicular to each other, an exciter unit to set the first oscillating element into oscillations, a device for sensing a deflection of the second oscillating element, at least one additional plate which is mounted such that it can pivot about an axis of rotation and which can be deflected by an acceleration acting perpendicular to the axis of rotation, as well as a device for sensing a deflection of the plate; the gimbal structure and the at least one plate being formed in a single wafer.

The inertial sensor according to the present invention is suitable for the measurement of a plurality of different types of motion data in different spatial directions, while nevertheless having a very small unit volume and delivering extremely accurate measuring results. This sensor allows monolithic integration, offering considerable advantages in manufacture. Additional error sources in the module integration are avoided. The inertial sensor or the sensor module are an inexpensive solution for measuring dynamic processes in a plurality of degrees of freedom of the motion, such as yaw rates, transverse and longitudinal acceleration of vehicles. In particular, it can be manufactured using the same method and made on a common substrate.

In a preferred embodiment, the inertial sensor includes one or more additional mass elements which are attached to the gimbal structure and/or to the plate.

Advantageously, the inertial sensor is composed of at least three planes; the wafer preferably being a center part wafer which is secured between a bottom wafer and a top wafer. Using this design, the manufacture is further simplified which further contributes to cost reduction. In particular, the design in three or more planes or wafer planes contributes to a reduction in surface, as well. That is, the individual sensors for the different motion components are made, for example, of three joined wafers. The center part wafer is preferably manufactured from silicon, and the bottom wafer and/or the top wafer are manufactured, for example, from glass.

Advantageously, both the gimbal structure and the plate are manufactured together in the wafer, that is, in a single wafer. That is, a rate-of-rotation sensor and at least one acceleration sensor are manufactured, for example, by silicon micromachining, in such a manner that they can be made together on one wafer. In this context, the axis of sensitivity of the rate-of-rotation sensor, i.e., the axis of a rotation to be measured, is aligned, for example, perpendicular to the wafer plane. Sensors for measuring accelerations, for example, perpendicular and/or parallel to the wafer plane, can be manufactured in any combination together with the rate-of-rotation sensor.

The wafer can have formed therein turning or twisting suspension means for the gimbal structure and/or for the plate. That is, the mechanical suspension means for the inertial masses or mass elements and/or plates which are excited and read out, for example, electrostatically are formed from the silicon wafer, that is, from a single silicon wafer.

The deflection of the plate and/or of the second oscillating element can be sensed capacitively. However, there are also other possible ways to detect deflections, for example, piezoelectrically or piezoresistively.

The device for sensing the deflection of the plate and/or of the second oscillating element includes, for example, a plurality of capacitive elements which can be arranged in such a manner that a change in capacitance in opposite directions is produced as a measuring signal in response to deflection. In this context, the individual sensors can be designed in such a manner that the torsion occurs about an axis of rotation lying parallel to the wafer plane and that it produces an oppositely-directed change of two capacitors. That is, the rate of rotation or acceleration to be measured generates a torque that results in a torsion or tilting of the plate or capacitance plate and, thus, in an change in capacitance in opposite directions. This serves as a measure of the rate of rotation or acceleration, achieving particularly high accuracy and reducing or preventing drift effects or other disturbances which would otherwise negatively influence the measurement.

Advantageously, the second oscillating element is designed as a frame and has an axis of oscillation or rotation which lies, for example, in the wafer plane and which, in particular, is aligned perpendicular to the axis of rotation of the first oscillating element. In this context, the first oscillating element, which is designed, for example, as a rocker or plate and attached or suspended within the second oscillating element, can include two or more mass elements aligned symmetrically to the wafer plane and, in particular, have an axis of rotation lying parallel to the wafer plane. In this context, the first oscillating element forms, for example, a torsional oscillator; that is, it is able to perform torsional oscillations about its axis of oscillation or rotation. This torsional oscillator is located within the frame or second oscillating element which can perform torsional oscillations about an axis lying, for example, parallel to the wafer plane and perpendicular to the axis of the oscillations of the rocker or first oscillator.

The plate has attached thereto, for example, at least one additional mass element, the common center of gravity of the plate and the additional mass element advantageously being offset from the axis of rotation of the plate in a direction perpendicular to the wafer plane. Thus, when an acceleration occurs in a direction parallel to the wafer plane, the plate is deflected due to the force of inertia so that the plate forms an acceleration sensor for measuring accelerations parallel to the wafer plane.

The plate is attached, for example, at two opposite locations or positions in the wafer plane in a manner allowing the plate to perform a rotary motion about an axis through the suspension points. Preferably, this axis runs through the center of the plate. In this context, the mass element or at least one mass can be arranged in the center of the plate in such a manner that it protrudes from the plane.

In a further embodiment of the present invention, at least one additional mass element is attached to the plate in such a manner that the common center of gravity of the plate and the additional mass element is offset from the axis of rotation of the plate in the direction of the wafer plane. In this manner, the plate is deflected in response to acceleration in a direction perpendicular to the wafer plane due to the action of inertial forces. That means that the plate designed in this manner forms an acceleration sensor that is sensitive to accelerations perpendicular to the wafer plane.

In other words, the sensor for measuring the acceleration perpendicular to the wafer place has a plate which can be attached at two opposite locations in the wafer plane in a manner allowing the plate to perform a rotary motion about an axis through the suspension points. In this case, the axis does not run through the center of the plate. At a location or position on the plate which, in particular, is situated at a distance from the axis of rotation, for example, in each case one mass or mass element which protrudes from the wafer plane is attached above and/or below, respectively, symmetrically to the plate.

Advantageously, a plurality of plates are provided or formed in the wafer to measure accelerations in three spatial directions perpendicular to each other. That is, the acceleration sensors formed from the plates with different axes of rotation can be provided separately or in combination with each other.

Advantageously, the acceleration sensor for measurement along a first axis parallel to the wafer plane has the same structure as the acceleration sensor for measurement along a second axis which is parallel to the wafer plane and directed perpendicular to the first axis. In this context, the acceleration sensors or the plates can also be arranged on the wafer in such manner that they are rotated by 90° relative to each other.

Advantageously, the wafer is located in a hermetically sealed interior space, provision being made, in particular, for electric feed-throughs to one or more external contact elements. In this manner, the interior of the sensor can be sealed in a liquid-tight and gas-tight manner. The electric feed-throughs provide electrical connection between the interior of the sensor and the external electrical contact points.

Preferably, provision is made for contact elements which can be formed in a planar manner and parallel to the wafer surface. Preferably, all electrical contact points have a planar design and are located parallel to the wafer or substrate surface. This also contributes to simplified manufacture and to simpler contacting of the sensors or of the individual sensor elements.

Advantageously, the mass element or elements are spherical in shape and secured in corresponding depressions of the wafer. In this context, it is possible to use, for example, steel balls or similar balls which preferably have a relatively high weight. Mounting in the depressions is simple and durable, in connection with which, for example, magnetic attachment or other known fastening options, such as gluing, etc., are possible as well.

According to another aspect of the present invention, a method for manufacturing a micromechanical inertial sensor is provided, including the steps of providing a wafer; forming a gimbal structure in the wafer, including a first and a second oscillating element; forming at least one additional plate in the wafer such that it can pivot about an axis of rotation lying in the wafer plane and be deflected by acceleration forces; forming an exciter unit for exciting the gimbal structure to oscillations; and forming in each case one device for measuring a deflection of the plate and of the gimbal structure, respectively; the gimbal structure and the at least one plate being formed in the wafer by patterning a single wafer using micromachining techniques.

In this manner, an accurate and space-saving inertial sensor which is suitable for measuring motion quantities in a plurality of different spatial directions can be manufactured in a cost-effective way. In particular, this method can be used to manufacture the micromechanical inertial sensor described herein. In a preferred embodiment of the method, in each case one further wafer is attached to the upper and lower sides of the wafer, respectively.

Advantageously, an hermetically tight interior space is formed between the further wafers; the gimbal structure and the plate being arranged in the interior space.

It is possible to attach one or more additional mass elements to the plate and/or to an oscillating element of the gimbal structure. That is, the sensors can each have at least one separately attached mass. The mechanical input, such as an acceleration or a rate of rotation, results in a tilting of a capacitor plate. This tilting causes two capacitances to change in opposite directions.

Advantageously, a final module test is carried out in the method, during which a combined test of individual sensor elements or of the entire module of sensor elements is performed. That is, the sensors of a module are subjected to a common test procedure. The individual tests of the sensors and the final module test can be combined, resulting, in particular, in savings of time and cost.

The inertial sensor according to the present invention allows measurement of accelerations perpendicular and parallel to the wafer plane and of a rate of rotation about an axis perpendicular to the wafer plane using individual sensors or sensor elements which, in particular, can be manufactured together on one substrate. The present invention eliminates the need to align separate sensors according to their axis of sensitivity. The axis of sensitivity is determined by the sensor structure and the arrangement on the substrate.

In particular, the present invention leads to the following advantages: small unit volume of the complete sensor module, that is, in particular, small amount of area required on the substrate for the combined manufacture of the module compared to the manufacture of the individual sensors. In particular, this results in a reduction of manufacturing costs.

During the assembly of a sensor module, subsequent alignment of the sensors along the axes of sensitivity is no longer needed. This results in higher accuracy and reduced manufacturing costs.

All electrical contact points can lie in the same plane. This further reduces the effort for contacting the sensor elements.

The sensors of a module can be subjected to a common test procedure. In this context, the individual tests of the sensors and the final module tests can be combined, resulting in further savings of time and cost.

A combined evaluation method, in particular, using a differential capacitance measurement principle, is possible for all sensors. This also results in additional cost reduction in the development and manufacture of the evaluation electronics.

BRIEF DESCRIPTION OF THE DRAWING

In the following, the present invention is explained with reference to a preferred exemplary embodiment.

FIG. 2 is a top view of the gimbal structure of the inertial sensor shown in FIG. 1;

FIG. 3 is a top view of an electrode structure for electrostatically driving the oscillations of the gimbal structure; and FIG. 4 is an enlarged sectional view of an outer edge section of the preferred embodiment of the inertial sensor according to the present invention.

DETAILED DESCRIPTION

Figure 1:
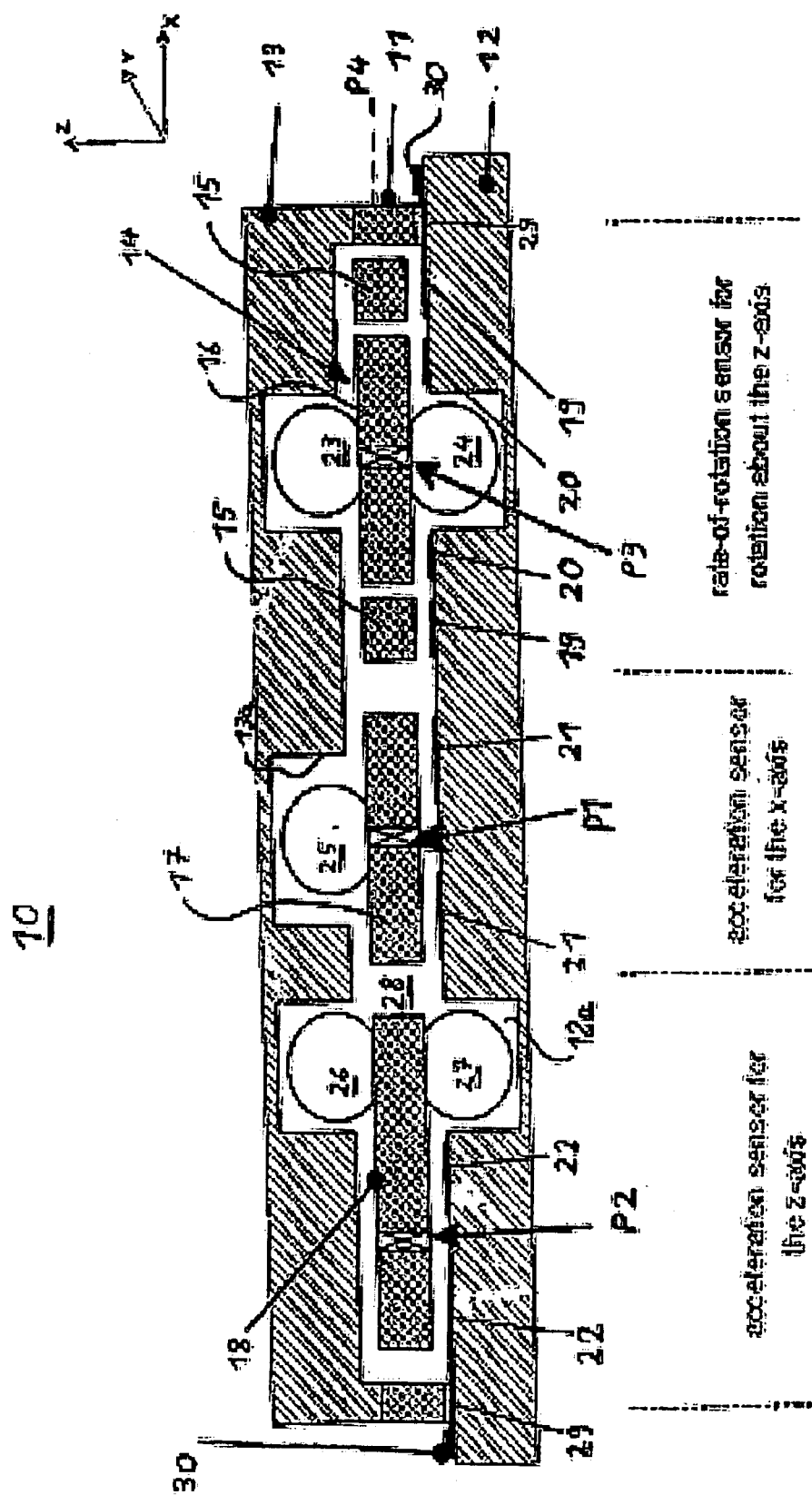
FIG. 1 is a sectional view of a preferred embodiment of the micromechanical inertial sensor according to the present invention.

FIG. 1 is a schematic sectional view of an inertial sensor or of a sensor module 10 which is a preferred embodiment of the present invention. In the present case, inertial sensor 10 is composed of three planes; a center part 11 being located between a bottom part 12 and a top part 13. Center part 11 is a wafer or substrate element in which are formed oscillatory structures. These oscillatory structures include a gimbal structure 14 having a first oscillating element 16 and a second oscillating element 15. In wafer 11 or the semiconductor body are also formed two plates 17, 18 which are each mounted in wafer 11 such that they can pivot about an axis of rotation P1, P2 lying in the wafer plane. Located on the inner surface of bottom part 12 are metallizations or conductive regions 20 which form an electrostatic exciter unit to set first oscillating element 16 into oscillations. Further metallizations or conductive regions 19 form a device for capacitively sensing a deflection of second oscillating element 15. Further metallizations or conductive regions 21, 22, which are formed on the surface of bottom part 12 facing center part 11, form a capacitively acting device for sensing a deflection of the respective plate 17, 18.

The movable or oscillatory structures in wafer 11, which forms the center part, are patterned in or from a single wafer using micromachining techniques. Center part 11 is a silicon wafer in which, based on the movable structures, are formed a rate-of-rotation sensor for measuring rotations about the z-axis, an acceleration sensor for measuring accelerations in the direction of the x-axis or y-axis, as well as an acceleration sensor for measuring accelerations in the direction of the z-axis. In this context, the rate-of-rotation sensor is formed by gimbal structure 14 while the acceleration sensor for the x-axis or y-axis is formed by plate 17, and the acceleration sensor for the z-axis is formed by plate 18.

Axes of rotation P1 and P2 of plates 17 and 18, respectively, each run perpendicular to the drawing plane, that is, in the y-direction so that plates 17 and 18 are supported in such a manner that they can rotate or oscillate in the z-direction.

First oscillating element 16 of gimbal structure 14 is also supported such that it can rotate or oscillate about an axis P3 directed perpendicular to the drawing plane, that is, in the y-direction. Thus, first oscillating element 16 of gimbal structure 14 can also be deflected in the z-direction or perform oscillations with a deflection in the z-direction. To this end, first oscillating element 16 is supported within second oscillating element 15, which has a frame-like design. The outer, frame-like second oscillating element 15 is supported on the remaining wafer 11 also such that it can oscillate or rotate; axis of rotation P4 of second oscillating element 15 running in the wafer plane in the x-direction, that is, perpendicular to axis of rotation P3 of first oscillating element 16.

On the upper and lower sides of wafer 11, additional spherical mass elemens 23, 24, 25, 26, 27 are arranged in the region of the movable structures formed therein. In this connection, the spherical mass elements are secured in depressions in the different regions of wafer 11 in a positive-locking manner. In the present case, the additional mass elements are steel balls which have a relatively high weight compared to the other components of the inertial sensor. However, it is also possible to use other shapes or materials for the additional mass elements 23, 24, 25, 26, 27.

First oscillating element 16, which is designed as a rocker, carries in each case one mass element 23, 24 on its upper and lower sides, respectively. The additional mass elements 23,24 on rocker 16 are centrally arranged above and below axis of rotation P3 of rocker 16, respectively; that is, mass elements 23,24 are aligned symmetrically to each other with respect to axis of rotation P3 of rocker 16. When sensor module 10 is rotated about an axis running perpendicular to the wafer plane (z-direction) while gimbal structure 14 oscillates about axis of rotation P3 of the, rocker or first oscillating element 16, which runs in the wafer plane in the y-direction, the frame or second oscillating element 15 is deflected due to the action of the Coriolis force. That is, frame 15 or the second oscillating element is deflected about axis of rotation P4. This deflection of frame 15 in the z-direction is a measure of the rate of rotation of the inertial sensor or sensor module 10 about an axis of rotation running in the z-direction.

On the upper side of first plate element 17, mass element 25 is centrally arranged and secured in a depression in a positive-locking manner. In this context, mass element 25 is located exactly above axis of rotation P1 of first plate 17. Consequently, the mass center is displaced with respect to axis of rotation P1 and with respect to the wafer plane. Thus, when inertial sensor 10 is accelerated in the x-direction, an inertial force acts due to additional mass element 25 so that first plate 17 is tilted about its axis of rotation P1. That is, plate 17 is deflected in the z-direction.

On the upper and lower sides of second plate 18, in each case one additional mass element 26 or 27 is arranged, respectively. Spherical mass elements 26, 27 are secured in depressions as described above. However, they are not centrally arranged above and below axis of rotation P2 of second plate 18, but offset with respect to this axis of rotation in the direction of the wafer plane or in the x-direction. In the present case, additional mass elements 26, 27 are attached at the edge of plate 18. That is, the center of gravity of mass elements 26, 27 is offset with respect to axis of rotation P2 in the x-direction or in the direction of the wafer plane. Upon acceleration in the z-direction, that is, perpendicular to the wafer plane or to the plane of sensor module 10, second plate 18 is deflected in the z-direction due to the action of inertial forces of additional mass elements 26, 27. In this process, plate 18 is tilted about axis of rotation P2 running in the y-direction.

It goes without saying that it is not essential to arrange in each case one mass element on the upper and lower sides, respectively, to produce the intertial forces for measuring the accelerations or the Coriolis force based on a rate of rotation. However, this arrangement including mass elements which are symmetrically arranged on the upper and lower sides has very great advantages with respect to the measuring accuracy of the sensor, which is considerably improved by the high degree of symmetry.

Top part 13 and bottom part 12, which, in the present case, are made of glass, are each provided with recesses 13a and 12a to receive additional mass elements 23, 24, 25, 26, 27. In this context, sufficient clearance is provided, allowing plate elements 17, 18 and gimbal structure 14 to perform pivoting or tilting motions.

At its edge regions, the semiconductor substrate or wafer 11 is firmly connected to bottom part 12 lying below and upper part 13 lying above. Due to this connection, a hermetically sealed interior space 28 is formed, in which are located the movable structures of wafer 11. Thus, the individual sensors formed or in patterned from wafer 11 for measuring accelerations and rates of rotation are sealed from the outside in a gas-tight and liquid-tight manner. In the present case, a pressure-tight connection is made, it being possible for interior space 28 to be evacuated.

All conductive regions for driving the sensor elements or for reading out tilting or pivoting motions of the movable structures are arranged on the upper side of bottom part 12 in a planar or flat manner. Conductive regions 19, 20, 21, 22 are aligned parallel to each other and parallel to the opposite surfaces of the center part or wafer 11.

Conductive region 20 is used to electrostatically drive the inner, rocker-like oscillating element 16 or gimbal structure 14. Conductive region 19 is located opposite the outer, frame-like oscillating element 15, forming a pair of capacitors for reading out the tilting motion or deflection of frame 15. In this context, a change in capacitance in opposite directions occurs, allowing measuring inaccuracies to be largely reduced.

Conductive region 21 is arranged in a flat manner opposite the bottom side of plate 17 and, together with plate 17, also forms a capacitor pair; one capacitor being formed on each side of axis of rotation P1. Here too, a change in capacitance in opposite directions is produced in response to deflection of plate 17 about axis of rotation P1.

Conductive region 22 is also formed in a flat manner on the upper side of bottom part 12 and aligned parallel to opposite plate 18. Here too, conductive region 22, together with plate 18, forms a capacitor pair which generates oppositely directed capacitance signals in response to deflection of plate 18.

Electric feed-throughs 29 in the edge region of sensor module 10 provide electrical connection between the sensor elements located in interior 28 and external electrical connections 30, via which are connected power supply, control, and signal evaluation units.

FIG. 2 shows a top view of a partial area of wafer 11, which forms gimbal structure 14 due to its pattern. Formed in this partial area are opposite outer slots 31, 32 and opposite inner slots 33, 34. In this manner, gimbal structure 14 is produced, including an outer frame which is supported in a manner that it can pivot or oscillate and which forms second oscillating element 15, as well as a rocker in the form of a plate, which is formed within the frame and movably or pivotably supported thereon, and which forms first oscillating element 16. Each of oscillating elements 15, 16 is mounted on oscillatory or twisting, opposing suspension means 35, 36 and 37,38, respectively. Each pair of opposing suspensions means 35, 36 and 37, 38, forms an axis of rotation P4 or P3, respectively, for gimbal structure 14, the two axes of rotation P4, P3 running perpendicular to each other in the wafer plane or component plane.

FIG. 3 shows the basic design of the conductive regions, which each form a pair of electrode surfaces 39. The above-described conductive regions 19, 20, 21, 22 are advantageously designed in this manner. Each electrode surface 39 is surrounded by a closed ring electrode 41. A terminal 43 or terminal pad for electrically contacting ring electrodes 41 is located at each of ring electrodes 41. Moreover, at an end of each electrode surface 39, a terminal 44 or terminal pad is provided for the respective electrode surface.

FIG. 4 is an enlarged sectional view of inertial sensor 10 or the sensor module. Center part 11 or the wafer is connected to bottom part 12 of glass by a pressure contact 45. In this context, a pressure-tight electric feed-through from the interior to the exterior of the sensor is provided in this region, as described above. Bottom part 12 slightly protrudes over center part 11 at the edge; that is, a projection is formed on whose upper side connection 30 is formed in the form of a terminal pad by suitable metallizations.

Plates 17, 18 (see FIG. 1), which form the above-described acceleration sensors for the z-axis and for the x-axis and/or y-axis, are each attached to remaining wafer 11 at opposite suspension points or positions, similarly to gimbal structure 14. Thus, they are also designed as a rocker element or rockers and are rotatable about an axis running through a region or a central region of the respective plate.

It goes without saying that axes of rotation P1, P2, P3, P4 of the individual oscillating elements can run in the most different spatial directions so that measuring sensitivities are possible for motion quantities in the most different directions. Similarly, it is possible that only one plate is formed in wafer 11 in addition to gimbal structure 14.

During the manufacture of the micromechanical inertial sensor, a gimbal structure is patterned in a wafer using micromachining techniques. Furthermore, at least one additional plate is patterned in the same wafer, the additional plate being able to pivot about an axis of rotation lying in the wafer plane. Now, conductive regions are applied to a wafer of glass, i.e., the later bottom wafer 12, which form the later exciter units for gimbal structure 14 and the readout units for measuring the plate deflections. On the patterned silicon wafer or semiconductor component, the above-described spherical mass elements are now inserted into the previously made depressions and secured therein. At its bottom side, the patterned wafer is subsequently connected to the glass wafer located below, which carries the conductive regions. A further glass wafer is now put on the patterned wafer from above, forming a sealed interior space between the upper and lower wafers.

The wafers are connected by pressure contacts at the egde, with electric feed-throughs being formed toward the outside. The sensor module is preferably evacuated.

Subsequently, a module test is carried out; that is, a combined test of the individual sensor elements or of the entire module of sensor elements is performed.

What is claimed is:

1. A micromechanical inertial sensor comprising:
   a gimbal structure formed from a single wafer having a wafer plane, the gimbal structure including a first oscillating element having a first axis of oscillation coupled to a second oscillating element having a second axis of oscillation aligned substantially perpendicular to the first axis of oscillation,
   an exciter unit configured to oscillate the first oscillating element;
   a first sensing device configured to sense a deflection of the second oscillating element;
   a first plate formed from the single wafer, the first plate being pivotable about a first axis of rotation and deflectable by an acceleration acting perpendicular to the first axis of rotation;
   a second sensing device configured to sense a deflection of the first plate;
   a first mass element attached to the first plate, wherein a common center of gravity of the first plate and the first mass element is offset from the first axis of rotation in a direction of the wafer plane; and
   a second plate formed in the single wafer and a third sensing device, the second plate being pivotable about a second axis of rotation and deflectable by an acceleration acting perpendicular to the second axis of rotation, the third sensing device configured to sense a deflection of the second plate.

2. The micromechanical inertial sensor as recited in claim 1, further comprising an additional mass element attached to the gimbal structure or the second plate.

3. The micromechanical inertial sensor as recited in claim 1, further comprising a top wafer defining a top plane and a bottom wafer defining a bottom plane, the single wafer being secured between the top and bottom wafers.

4. The micromechanical inertial sensor as recited in claim 3, wherein the single wafer includes silicon, and the bottom wafer or the top wafer include glass.

5. The micromechanical inertial sensor as recited in claim 1, further comprising a plurality of twisting suspension means formed in the single wafer for suspending the gimbal structure, the first plate or the second plate.

6. The micromechanical inertial sensor as recited in claim 1, wherein the first, second or third sensor is configured to sense capacitively.

7. The micromechanical inertial sensor as recited in claim 1, wherein the first, second or third sensor includes a plurality of capacitive elements disposed so as to produce a measuring signal in response to deflection, the measuring signal corresponding to a change in capacitance in opposite directions.

8. The micromechanical inertial sensor as recited in claim 1, wherein the second oscillating element is a frame and the second axis of oscillation lies in the wafer plane and is aligned perpendicular to the first axis of oscillation.

9. The micromechanical inertial sensor as recited in claim 1, wherein the first oscillating element includes at least two mass elements disposed symmetrically to the wafer plane and the first axis of oscillation is aligned parallel to the wafer plane.

10. The micromechanical inertial sensor as recited in claim 1, further comprising an additional mass element attached to the second plate such that a common center of gravity of the second plate and the additional mass element is offset from the second axis of rotation in a direction perpendicular to the wafer plane.

11. The micromechanical inertial sensor as recited claim 10, wherein the second axis of rotation runs through a center of the second plate, and the additional mass element is disposed at the center of the second plate and protruding from the wafer plane.

12. The micromechanical inertial sensor as recited in claim 1, further comprising a plurality of conductive layers disposed in a plane parallel to the wafer plane.

13. The micromechanical inertial sensor as recited in claim 1, wherein the single wafer is disposed in a hermetically sealed interior space and further comprising a plurality external contact elements and a plurality of electric feed-throughs, each of the feed-throughs connecting a respective one of the plurality of external contact elements to the single wafer.

14. The micromechanical inertial sensor as recited in claim 1, wherein the single wafer includes a depression, the first mass element including a spherical shape being secured to the single wafer in the depression.

15. A method for manufacturing a micromechanical inertial sensor comprising the steps of:
   providing a single wafer defining a wafer plane;
   forming a gimbal structure in the single wafer, the gimbal structure including a first and a second oscillating element;
   forming a first plate in the single wafer such that the plate is pivotable about an axis of rotation lying in the wafer plane and is deflectable by an acceleration force, wherein the forming of the first plate and the forming of the gimbal structure are performed by patterning the single wafer using a micromachining technique;
   disposing at least a first mass element on the first plate such that a common center of gravity of the plate and the additional mass element is offset from the axis of rotation a direction of the wafer plane;

forming an exciter unit for exciting the gimbal structure to oscillations;

forming a first sensing device for measuring a deflection of the gimbal structure;

forming a second sensing device for measuring a deflection of the first plate; and forming a second plate in the single wafer such that the second plate is pivotable about a second axis of rotation and deflectable by an acceleration acting perpendicular to the second axis of rotation.

16. The method as recited in claim 15, further comprising:

disposing a top wafer on an upper side of the single wafer; and disposing a bottom wafer on a lower side of the single wafer, the disposing being performed so as to form a hermetically tight interior space between the top and bottom wafers, the gimbal structure and the plate being located in the interior space.

17. The method as recited in claim 15, further comprising attaching at least one additional mass element to at least one of the second plate and the oscillating element.

18. The method as recited in claim 15, further comprising performing a final module test of the micromechanical inertial sensor, the final mode test including a test of an oscillating of the gimbal structure, a test of a pivoting of the first plate and a test of the entire micromechanical inertial sensor.

* * * * *